United States Patent

Ficon et al.

[15] 3,665,710
[45] May 30, 1972

[54] FLUID INJECTORS

[72] Inventors: Joseph Ficon, Franklyn Lakes, N.J.; Joseph Clemente, Gatersburg, Md.

[73] Assignee: Thiokol Chemical Corporation, Bristol, Pa.

[22] Filed: Dec. 27, 1966

[21] Appl. No.: 605,008

[52] U.S. Cl. .................................................. 60/258
[51] Int. Cl. .................................................. F02k 9/02
[58] Field of Search .......................... 60/258, 39.74

[56] References Cited

UNITED STATES PATENTS 3,045,424  7/1962  Morrell ................................ 60/258
3,074,231  1/1963  Klein .................................... 60/258
3,166,900  1/1965  Stegen ................................. 60/258
3,232,049  2/1966  Rhodes ................................ 60/258

Primary Examiner—Douglas Hart
Attorney—Thomas W. Brennan

[57] ABSTRACT

A rocket motor fluid injector having internal fluid passages connecting to propellant sources and an additional passage connected to a tank pressurizing gas source. A slidable pintle is also provided to throttle propellant flow while still permitting a constant gas flow into the rocket motor combustion chamber during throttling.

2 Claims, 3 Drawing Figures

Patented May 30, 1972  3,665,710

INVENTORS
JOSEPH FICON
JOSEPH M. CLEMENTE
BY Edwin D. Grant
ATTORNEY

FLUID INJECTORS

This invention relates to fluid injectors and more particularly to fluid injectors that can advantageously be used in rocket motors.

In certain rocket motors gas pressure is employed to force propellant from a storage tank to a fluid injector. Where gas for this purpose is supplied from some source at a constant pressure, some provision must be made for venting gas to the atmosphere (or to space) when the flow of propellant from the pressurized tank is throttled, since the pressure within said tank would otherwise increase to an unsafe level. From the standpoint of aerodynamics and other considerations, it would be preferable to vent such pressurizing gas to the combustion chamber of a rocket motor during a period of throttled propellant flow. The present invention provides a fluid injector which utilizes a small amount of gas from a constant pressure source to increase the efficiency of mixing of liquid fuel and oxidizer in the combustion chamber of a rocket motor and which automatically vents a larger amount of this gas to said combustion chamber when the rocket motor is throttled.

It is accordingly an object of this invention to provide an improved fluid injector.

Another object of the invention is to provide effective means for regulating the pressure of a rocket motor propellant tank pressurized by constant pressure gas source.

Still another object of the invention is to provide a fluid injector by means of which two annular jets can be formed and impinged at all points on the locus of a circle.

An additional object of the invention is to provide an uncomplicated, durable fluid injector capable of precisely controlling the flow rates of two combustible fluids into a combustion chamber.

Other objects and advantages of the present invention will become apparent as the following specification is read, reference being taken to the accompanying drawings wherein.

Throughout the specification and drawings, like numbers designate like parts.

Figure 1:
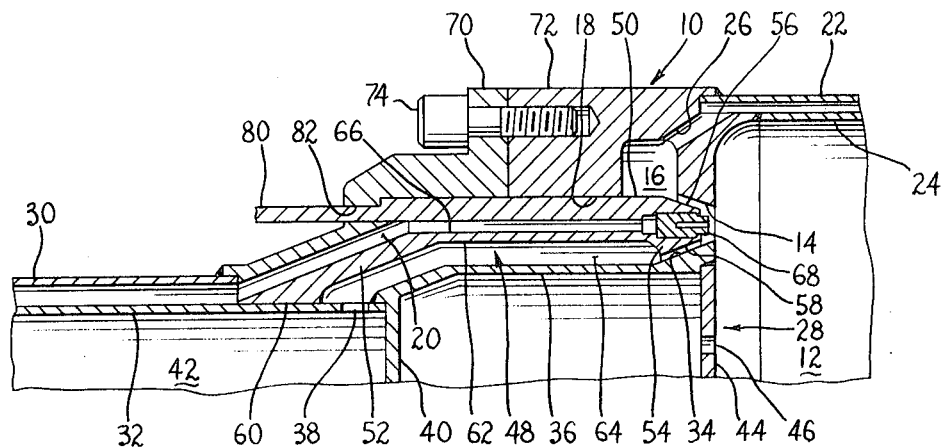
FIG. 1 is a sectional view taken along the longitudinal axis of a preferred embodiment of the invention employed in a rocket motor.

As illustrated in FIG. 1, a preferred embodiment of the invention comprises an annular housing (generally designated by the number 10) the inner surface of which successively defines a combustion chamber 12, a first bore 14 divergent from said combustion chamber, a second bore 16 extending radially from said first bore, a third bore 18 having a smaller diameter than said second bore, and a fourth bore 20 convergent from said third bore. Housing 10 is fixedly connected to a rocket motor casing (not shown) and is coaxial therewith, with combustion chamber 12 being at the aft end of said casing. The aft portion of housing 10 is formed with two concentric walls 22, 24, and a plurality of holes 26 extend between second bore 16 and the annular space between said walls.

A tubular post (generally designated by the number 28) is fixedly and coaxially disposed within bores 14, 16, 18 and 20 of housing 10, the aft end of said post being in the same plane as the aft edge of first bore 14 and the forward end of said post being concentrically disposed within a tube 30 joined at its aft end to the forward end of said housing and in communication with fourth bore 20 thereof. More specifically, post 28 comprises a first cylindrical forward portion 32, a second aft portion 34 disposed opposite the wall of first bore 14 and convergent relative thereto (i.e., the diameter of said second portion 34 increases toward combustion chamber 12, as illustrated in the drawing), and a third portion 36 intermediate said first and second portions and having a plurality of ports 38 extending through the wall thereof. It should be noted that the third portion 36 of post 28, as defined herein, includes a portion of the aft end of the cylinder designated by the number 32 in FIGS. 1 and 2. More specifically, the third portion 36 of post 28 is to be understood, for the purpose of interpretation of claims appended hereto, as that portion of said post between the second portion 34 thereof and the portion of the post that is contacted by the wall of an aperture 60 in a pintle 48 that will be described hereinafter. A partition 40 is fixedly attached to post 28 and extends across the interior 42 thereof aft of ports 38, and an end closure 44 is fixedly attached to the aft end of said post and is formed with a centrally disposed orifice 46.

The preferred form of the invention is provided with a pintle (generally designated by the number 48) comprising a first cylindrical portion 50 slidably engaged with the wall of third bore 18 and a second conical portion 52 joined at its larger end to the forward end of said first portion 50 and coaxial therewith. The aft end of said first portion 50 of pintle 48 is formed with a circumferentially extending, radially projecting shoulder 54 and is tapered to form a first outwardly facing seating surface 56 conforming with the wall of first bore 14 and a second inwardly facing seating surface 58 conforming with second portion 34 of post 28. Second portion 52 of pintle 48 is disposed within fourth bore 20 and conforms with the wall thereof, and its forward end is formed with an aperture 60 the wall of which slidably engages first portion 32 of post 28. The inner surface 62 of pintle 48 between second seating surface 58 and the wall of aperture 60 is spaced from the surface of post 28 and thus defines an annular space 64 around third portion 36 of the latter, and the length of pintle 48 is such that second portion 52 thereof is spaced from the wall of fourth bore 20 when first and second seating surfaces 56, 58 are respectively spaced from the wall of first bore 14 and the second portion 34 of post 28. Pintle 48 also has a plurality of gas passages 66 extending longitudinally through first portion 50 thereof, these gas passages communicating with combustion chamber 12 and the space between the wall of fourth bore 20 and second portion 52 of said pintle. Preferably a jet mix nozzle 68 is fixedly disposed in the aft end portion of each gas passage 66, although in some embodiments of the invention these nozzles may be omitted.

Housing 10 is made in two sections 70, 72 secured together by a plurality of machine screws 74. Section 70 is provided with a circumferentially extending groove 76 in which an annular lip 78 on the forward end of the first portion 50 of pintle 48 is slidably engaged. One end of a drive shaft 80 extends through a hole 82 in the wall of section 70 of housing 10 and is fixedly connected to lip 78. The other end of this drive shaft is connected to an actuator (not shown) adapted to move the drive shaft, and pintle 48, longitudinally of housing 10.

It will be recognized that the components of the above-described embodiment of the invention can be made of many different, well-known materials. Components which are exposed to hot gases, such as end closure 44, preferably are formed of a heat-resistant metal, and in some cases can be coated with a suitable insulation.

The annular space between the walls 22, 24 of the aft portion of housing 10 is connected by suitable conduit means to a propellant tank of the rocket motor in which the aforedescribed injection apparatus is incorporated. Likewise, the forward portion 32 of post 28 communicates with a second propellant tank of the rocket motor. Both of these propellant tanks are pressurized by a constant pressure gas source which is connected to tube 30. Thus during the operation of the rocket motor a first propellant (which may be an oxidizer) is forced under pressure to second bore 16, and a second propellant (which may be a fuel) is forced under pressure to the annular space 64 around third portion 36 of post 28. It will be obvious that when pintle 48 is in the position thereof illustrated in FIG. 1, these propellants will be injected into combustion chamber 12 in the form of two annular jets that impinge at a plane spaced from end closure 44 and disposed parallel thereto, the propellant in second bore 16 flowing through the annular gap between the wall of first bore 14 and first seating surface 56 of said pintle and the propellant in annular space 64 flowing through the annular gap between the surface of second portion 34 of post 28 and second seating surface 58 of said pintle. Also, when pintle 48 is in the position thereof illustrated in FIG. 1, there is an annular gap of relatively small cross-sectional area between the outer surface of second portion 52 of said pintle and the wall of fourth bore 20 of housing 10. Thus, a small amount of gas from the constant pressure gas source employed for pressurizing the aforementioned two propellant tanks is allowed to flow through each of the gas passages 66 in pintle 48 as the propellants from said tanks are injected into combustion chamber 12. The impingement of the high pressure gas jets from the jet mix nozzles 68 increases the efficiency of mixing of the two propellants.

Figure 2:
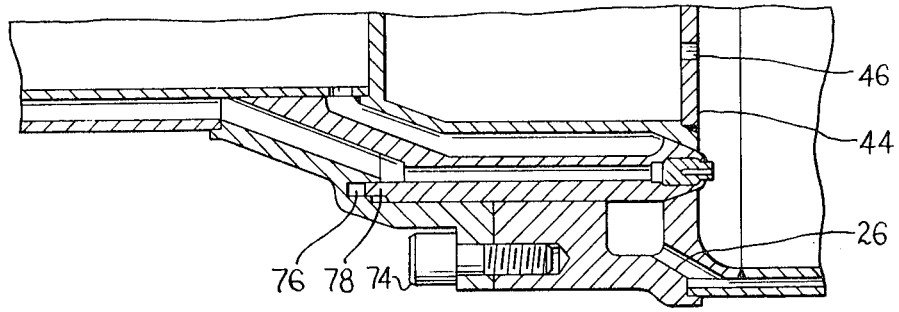
FIG. 2 is a sectional view taken along the longitudinal axis of the same embodiment, illustrating a different position of a component thereof.

When the flow of propellants into combustion chamber 12 is to be terminated, the actuator connected to drive shaft 80 is operated to move pintle 48 to the position thereof illustrated in FIG. 2, wherein seating surfaces 56, 58 are engaged with the wall of first bore 14 of housing 10 and the outer surface of second portion 34 of post 28, respectively. In this position of pintle 48, the gap between the outer surface of second portion 52 of said pintle and the wall of fourth bore 20 of housing 10 has a relatively large cross-sectional area, and consequently a large amount of the gas employed for pressurizing the propellant tanks of the rocket motor is vented to combustion chamber 12 through the gas passages 66 in said pintle. The pressure in the propellant tanks thus does not increase to the level it would reach if propellant flow to combustion chamber 12 were terminated and gas from the constant pressure gas source were not diverted from the propellant tanks.

Figure 3:
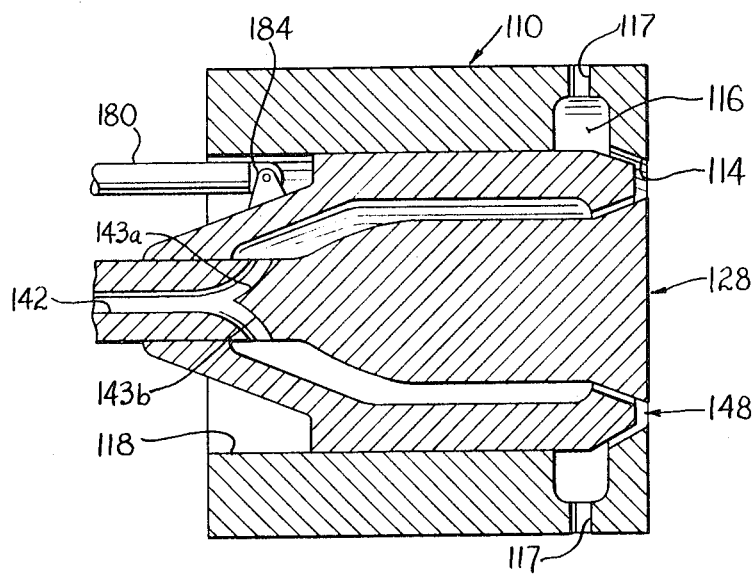
FIG. 3 is a sectional view taken along the longitudinal axis of a second embodiment of the invention.

FIG. 3 illustrates a second embodiment of the invention having components that are similar to those of the embodiment of FIGS. 1 and 2 but somewhat simpler in construction. More specifically, the second embodiment of the invention comprises an annular housing 110 formed with a first bore 114 divergent from one end thereof, a second bore 116 extending radially from said first bore and communicated with the exterior of said housing by a plurality of fluid inlets 117, and a third bore 118 having a smaller diameter than said second bore and extending between it and the other end of said housing. A post 128 is coaxially disposed within the bores of housing 110 and fixed relative to the latter by suitable structural means, said post having the same shape as post 28 of the first embodiment and being formed with a longitudinally extending passage 142 that branches into two channels 143a, 143b which extend to the surface of the post. The pintle 148 of the second embodiment is identical to pintle 48 of the first embodiment except that the latter is provided with gas passages 66 whereas pintle 148 is not. A drive shaft 180 is connected to a lug 184 integrally formed on pintle 148, so that the latter can be moved longitudinally of housing 110 to close the annular gaps between the tapered end of said pintle and the wall of bore 114 and the surface of post 128, respectively.

It will be understood from the foregoing discussion that combustible fluids can be forced under pressure through passage 142 and channels 143a, 143b to the annular space between pintle 148 and post 128, and through inlets 117 to second bore 116, to thereby form two annular jets which impinge at a plane spaced from the end surface of post 128 and disposed parallel thereto. The amount of fluid discharged from the injector can readily be controlled by varying the position of pintle 148 within housing 110.

Other modifications of the two embodiments of the invention described and illustrated herein can obviously be made without departing from the principles on which their construction and operation are based. The scope of the invention is therefore limited only by the terms of the following claims.

What is claimed is

1. In a rocket motor having fuel and oxidizer tanks pressurized by a gas source, propellant injection apparatus comprising:
   an annular housing the inner surface of which successively defines a combustion chamber, a first bore divergent from said combustion chamber, a second bore extending radially from said first bore and communicating with one of said fuel and oxidizer tanks, a third bore having a smaller diameter than said second bore, and a fourth bore convergent from said third bore and communicating with said gas source;
   a tubular post fixedly and coaxially disposed within said bores of said housing and having one end substantially even with the aft edge of said first bore, said post comprising a first cylindrical forward portion, a second aft portion disposed opposite the wall of said first bore and convergent relative thereto, and a third portion intermediate said first and second portions and having at least one port extending through the wall thereof, the end of said post remote from said combustion chamber communicating with the one of said fuel and oxidizer tanks not connected to said second bore;
   a partition fixedly attached to said post and extending across the interior thereof aft of said port therein;
   an annular pintle comprising a first cylindrical portion slidably engaged with the wall of said third bore and a second conical portion joined at its larger end to the forward end of said first portion and coaxial therewith, the aft end of said first portion of said pintle being tapered to form a first outwardly facing seating surface conforming with the wall of said first bore and a second inwardly facing seating surface conforming with said second portion of said post, said second portion of said pintle being disposed within said fourth bore and conforming with the wall thereof and its forward end being formed with an aperture the wall of which slidably engages said first portion of said post, the inner surface of said pintle between said second seating surface and the wall of said aperture being spaced from the surface of said post to define an annular space around said third portion of the latter, the length of said pintle being such that said second portion thereof is spaced from the wall of said fourth bore when said first and second seating surfaces are spaced from the wall of said first bore and said second portion of said post respectively, said pintle having a plurality of gas passages extending longitudinally through said first portion thereof and communicating with said combustion chamber and the space between the wall of said fourth bore and said second portion of said pintle; and means for moving said pintle longitudinally of said housing.

2. Propellant injection apparatus in accordance with claim 1 including an end closure fixedly attached to the aft end of said post.

* * * * *